US005327780A

United States Patent [19]

Entenmann et al.

[11] Patent Number: 5,327,780

[45] Date of Patent: Jul. 12, 1994

[54] METHOD AND ARRANGEMENT FOR MONITORING THE OPERABILITY OF A HEATER OF AN OXYGEN MEASURING PROBE

[75] Inventors: Robert Entenmann, Benningen; Alfred Kratt, Schwieberdingen; Rudolf Moz, Möglingen, all of Fed. Rep. of Germany

[73] Assignee: Robert Bosch GmbH, Stuttgart

[21] Appl. No.: 935,188

[22] Filed: Aug. 26, 1992

[30] Foreign Application Priority Data

Aug. 27, 1991 [DE] Fed. Rep. of Germany ....... 4128385

[51] Int. Cl.[5] ........................................ G01M 19/00

[52] U.S. Cl. .................................. 73/118.1; 324/549

[58] Field of Search ............... 324/549, 537; 73/118.1; 340/428; 123/697

[56] References Cited

U.S. PATENT DOCUMENTS

| | | | |
|---|---|---|---|
| 3,915,828 | 10/1975 | Cleary et al. | 204/195 S |
| 4,170,967 | 10/1979 | Wessel et al. . | |
| 4,419,190 | 12/1983 | Dietz et al. | 204/1 T |
| 4,958,611 | 9/1990 | Uchinami et al. | 123/697 X |
| 5,054,452 | 10/1991 | Denz | 123/479 |
| 5,090,387 | 2/1992 | Mayer et al. | 123/479 |

FOREIGN PATENT DOCUMENTS

| | | |
|---|---|---|
| 0068323 | 1/1983 | European Pat. Off. . |
| 0358972 | 3/1990 | European Pat. Off. . |
| WO90/06431 | 6/1990 | PCT Int'l Appl. . |

*Primary Examiner*—Tom Noland

*Attorney, Agent, or Firm*—Walter Ottesen

[57] ABSTRACT

The invention relates to a method and an arrangement for monitoring the operability of a heater of an oxygen-measuring probe which is mounted in the exhaust-gas channel of an internal combustion engine. The principle of operation of the invention is based on the fact that the supply voltage of the probe heater drops during loading by the electrical resistance of the heating element. The voltage difference is dependent upon the magnitude of the resistance and therefore at least the three states can be distinguished, namely: normal operation, circuit interruption and short circuit. The operational state of the probe heater which is so determined is displayed to the driver by activation of a corresponding control unit and/or is stored, as required, in a fault memory. The arrangement according to the invention can be realized by a computer or in a compact configuration and is suitable for use in a central control apparatus.

6 Claims, 2 Drawing Sheets

METHOD AND ARRANGEMENT FOR MONITORING THE OPERABILITY OF A HEATER OF AN OXYGEN MEASURING PROBE

FIELD OF THE INVENTION

The method of the invention and the arrangement for carrying out the method relate to monitoring the operability of a heater for an oxygen measuring probe which is mounted in the exhaust-gas channel of an internal combustion engine. The check on operability includes the supply line of the heater.

BACKGROUND OF THE INVENTION

The oxygen content of the exhaust gas is determined by the oxygen measuring probe and the value determined in this manner is supplied to a control arrangement which controls to a pregiven air/fuel ratio. The oxygen measuring probe is operationally ready only above a minimum operating temperature. In this way, the control of the air/fuel mixture via the oxygen measuring probe is only then possible when the probe has reached its operating temperature. Only then can there be a control to an optimal air/fuel mixture, for example, with respect to a low emission of toxic materials. In order to maintain low emission values, the operating temperature of the oxygen measuring probe should reach its operating temperature as quickly as possible after the internal combustion engine is started. The probe is heated by the exhaust gases and this heating is accelerated by an electric probe heater for the above-mentioned reasons. The electric probe heater is then also required when, for example, the heat capacity of the exhaust gas is inadequate such as during idle in order to maintain the probe at the operating temperature or for an overrun operation of long duration.

It is necessary to monitor the operability of the probe heater for obtaining a low emission of toxic materials. Numerous methods are known to detect one or more fault conditions, namely: circuit interruptions, short circuits and shunts. The check of the operational readiness of the probe heater is made, for example, in the following ways: from the current flow through the probe heater detected by means of a measuring resistor (U.S. Pat. No. 5,285,762); via the output signals of the probe (U.S. Pat. Nos. 4,170,967 and 5,054,452); via the warm-up performance of the probe (U.S. Pat. No. 5,090,387); or via the probe temperature which can be determined in various ways such as from the internal resistance of the probe (U.S. Pat. No. 4,419,190); or, with a temperature sensor (U.S. Pat. No. 3,915,828).

SUMMARY OF THE INVENTION

The method of the invention affords the advantage that the method can be realized with very simple means. The voltage which is applied for the diagnosis is already available in a conventional probe heater without modification. Thus, no intervention in the circuitry of the probe heater is required; instead, a suitable evaluation electronics must be provided which measures the supply voltage of the probe heater at specific time points and which processes the measured values correspondingly. Such an electronic circuit can be compactly configured and is cost effective and robust.

The realization is likewise without difficulty in computer-controlled systems. This viewpoint is very important since the possibility of diagnosis can also be used in combination with control apparatus manufactured in series production. Furthermore, monitoring of the operation of the operating units relative to exhaust gas will soon be required by statute which will lead to a great need for cost-effective and reliable monitoring devices as provided by the invention.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
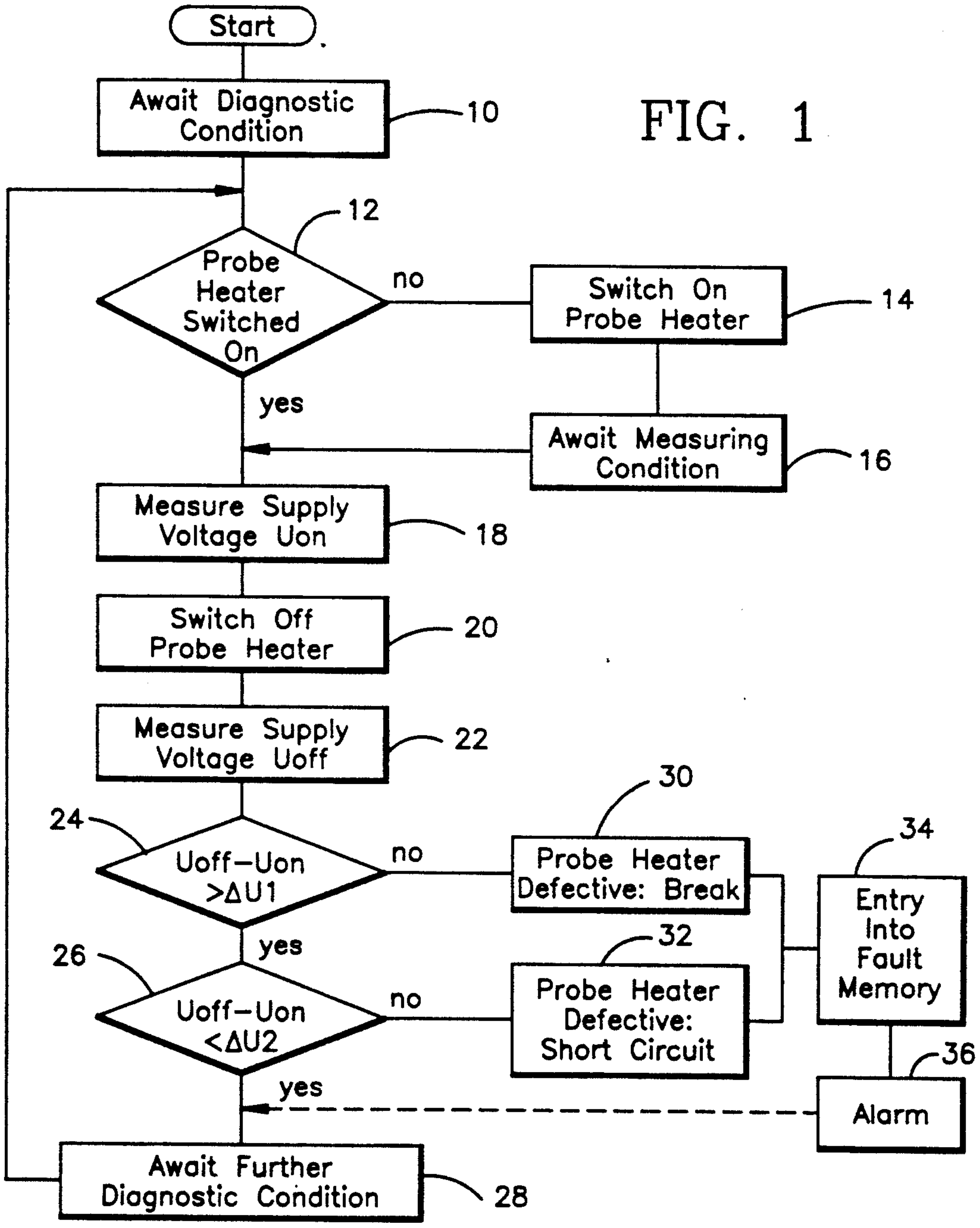
FIG. 1 shows a flowchart illustrating one embodiment of the method of the invention; and, FIG. 2 is a schematic of an embodiment of the arrangement according to the invention for monitoring the operability of the heater of an oxygen measuring probe.

The invention relates to a method and an arrangement for monitoring the operability of the heater of an oxygen-measuring probe. The invention is based on the principle that the supply voltage of the probe heater drops when loaded by the electrical resistance of the probe heater and that a conclusion can be drawn as to the operability of the probe heater from the magnitude of the voltage change in response to the load of the resistance. The result of the operability check is then indicated to the driver optically and/or acoustically. In addition to or in lieu of the warning signals, an entry can be made into a fault memory for a later fault readout depending on how the invention is configured.

As shown in the drawing, a diagnostic condition is awaited in the first step 10 of the flowchart before a first function test is carried out. The diagnostic condition is adapted to the special situations. This condition can include, for example, the time duration since the engine has been started, the distance already travelled, the engine temperature, or similar parameters. A mix of various conditions is also conceivable.

Step 10 is followed by step 12 wherein the check is made as to whether the probe heater is switched on. In the case where the probe heater is switched off, the probe heater is switched on in the next step 14 and then, in step 16, the presence of a measuring condition is awaited. In the embodiment shown here, the measuring condition is satisfied when a pregiven time span has passed.

Step 18 is carried out after step 16 and the supply voltage Uon is measured and stored. Step 18 is also reached when, in step 12, a determination is made that the probe heater is switched on. After step 18, the probe heater is switched off in step 20 and, in the following step 22, the supply voltage Uoff is measured. In the next step 24, the difference of Uoff and Uon is compared to a pregiven value $\Delta U1$ and step 26 is carried out if this difference is greater than $\Delta U1$. In step 26, the difference is applied for a second comparison. A check is made as to whether the difference is less than a pregiven value $\Delta U2$. If this is the case, then, in following step 28, a further diagnostic condition is awaited and thereafter a return is made to step 12.

If it is determined in step 24 that the difference of Uoff and Uon is not greater than a pregiven value $\Delta U1$, then in the subsequent step 30, a conclusion is drawn as to an interrupted and therefore defective probe heater. A short circuit of the heater is detected in step 32 which follows step 26 in the event that the condition checked in step 26 is not satisfied. Step 30 as well as step 32 moves into step 34 wherein a corresponding entry in the fault memory takes place. After step 34, an alarm signal is emitted in step 36.

A functional probe heater provides a load on the supply voltage because of its electrical resistance so that the supply voltage increases when the probe heater is switched off. In the event that there is an interruption of the circuit of the probe heater and/or the supply line, the supply voltage does not change because of the switching procedure. Accordingly, a conclusion is drawn in step 30 as to a defective probe heater (including supply lines) and in step 34 a fault announcement is entered into the fault memory and a corresponding warning signal is emitted in step 36 if, in steps 18 to 24, no voltage change more than the pregiven value ΔU1 has been observed.

If in contrast, the observed voltage change is greater than ΔU1, then the assumption can be made that no interruption is present. However, the possibility of a short circuit still remains which leads to an especially high load on the supply voltage and therefore to a large voltage change. If the voltage change in inquiry 26 exceeds a pregiven maximum value ΔU2, then a conclusion is made in step 32 that a short circuit is present. The entry into the fault memory follows in step 34 and a corresponding warning signal follows in step 36.

The diagnosis of the probe heater is repeated each time when a further diagnostic condition is satisfied in step 28 in order to make possible a continuous monitoring of the probe heater. This diagnostic condition can be dependent upon the same parameters as the diagnostic condition of step 10. However, the conditions must not be identical and correspond to the special application and statutory requirements. Depending upon application, the operational check is repeated in the case of an operational probe heater and/or one that has been detected as being defective.

Figure 2:
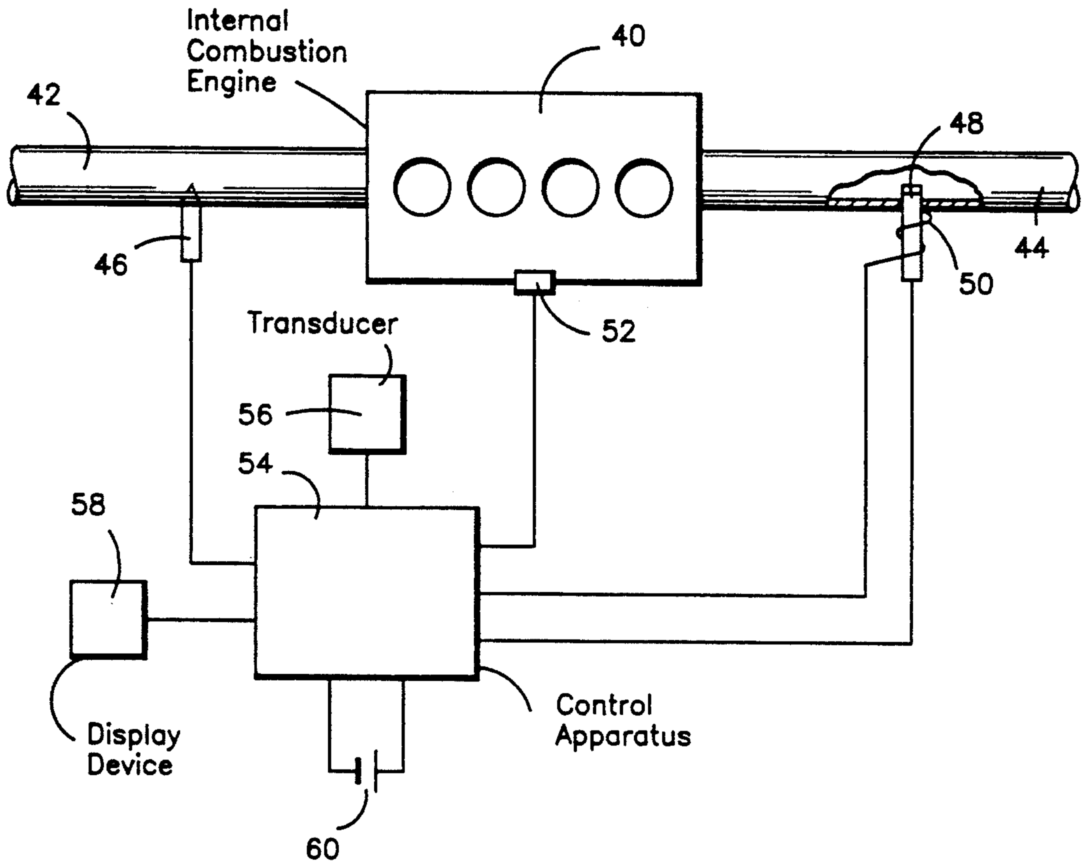

FIG. 2 is a schematic of an arrangement for carrying out the method according to the invention which has been explained above with reference to FIG. 1. An internal combustion engine 40 draws in air via an intake pipe 42 and discharges exhaust gas to an exhaust gas channel 44. A fuel metering device 46 is mounted in the intake pipe 42. An oxygen measuring probe 48 is mounted in the exhaust gas channel 44 and can be heated by means of a heater 50. A temperature sensor 52 is mounted on the engine 40. The fuel metering device 46, the oxygen measuring probe 48, the heater 50 and the temperature sensor 52 are all connected to a control apparatus 54. All connections are represented by a simple line in FIG. 1 to provide clarity. These lines can represent one or more lines depending upon technical requirements.

In addition, the control apparatus is connected to a transducer 56 which detects the distance traveled by the motor vehicle. The control apparatus 54 is also connected to a display device 58 which is activated by the apparatus 54 when a defective operation of the heater 50 of the oxygen measuring probe is detected. The control apparatus 54 is supplied with voltage via respective connections to the positive and negative poles of a battery 60.

The operation of the arrangement shown in FIG. 2 is evident from the flowchart of FIG. 1 and the descriptive material corresponding thereto. The temperature sensor 52 and the transducer 56 supply data to the control apparatus 54 required for detecting the diagnostic conditions (steps 10 and 28 of FIG. 1). The measurement of the supply voltage of the heater 50 of the oxygen measuring probe, the time measurement and the further processing of the measured values are all carried out by the control apparatus 54.

As an alternate to the embodiment shown here, an arrangement is advantageous wherein the first measurement of the supply voltage takes place when the probe heater is switched off and the second measurement takes place with the probe heater switched on. In this way, a possible fault of the probe heater can be detected already after a very short operating time. This is especially the case for a short circuited probe heater since the supply voltage source is not subjected unnecessarily long to the high load which is then present.

It is understood that the foregoing description is that of the preferred embodiments of the invention and that various changes and modifications may be made thereto without departing from the spirit and scope of the invention as defined in the appended claims.

What is claimed is:

1. A method for monitoring the operability of the heater of an oxygen measuring probe mounted in the exhaust gas channel of an internal combustion engine, the method comprising the following steps for each monitoring of the heater:

making a first measurement of the supply voltage of the probe heater when the probe heater is switched on and making a second measurement of the supply voltage when the probe heater is switched off;

monitoring the difference between said first and second measurements of the supply voltage and, when said difference drops below a pregiven minimum value or exceeds a pregiven maximum value, then emitting corresponding fault signals and/or reading said signals into a fault memory.

2. A method for monitoring the operability of the heater of an oxygen measuring probe mounted in the exhaust gas channel of an internal combustion engine, the method comprising the steps of:

making a first measurement of the supply voltage of the probe heater when the probe heater is switched on as soon as a first diagnostic condition is satisfied;

making a second measurement of the supply voltage when the probe heater is switched off;

monitoring the difference between said first and second measurements of the supply voltage and, when said difference drops below a pregiven minimum value or exceeds a pregiven maximum value, then emitting corresponding fault signals and/or reading said signals into a fault memory.

3. The method of claim 2, wherein the first diagnostic condition and/or the further diagnostic condition are separately selectable and are satisfied when specific operating characteristic variables are present.

4. The method of claim 3, wherein said operating characteristic variables include the following: the time elapsed since the engine was started, the time elapsed since the last diagnosis of said heater, the road distance travelled or the engine temperature.

5. A method for monitoring the operability of the heater of an oxygen measuring probe mounted in the exhaust gas channel of an internal combustion engine, the method comprising the steps of:

making a first measurement of the supply voltage of the probe heater when the probe heater is switched on and making a second measurement of the supply voltage when the probe heater is switched off;

monitoring the difference between said first and second measurements of the supply voltage and, when said difference drops below a pregiven minimum value or exceeds a pregiven maximum value, then emitting corresponding fault signals and/or reading said signals into a fault memory; and, repeating a function test when at least one further diagnostic condition is present.

6. An arrangement for monitoring the operability of the heater of an oxygen measuring probe mounted in the exhaust gas channel of an internal combustion engine, the heater being supplied by a supply voltage, the arrangement comprising:

means for detecting the presence of a diagnostic condition;

means for making a first measurement of the supply voltage of said heater when said heater is switched on and for making a second measurement of said supply voltage when said heater is switched off;

means for forming the difference between said first and second measurements; and, means for emitting a corresponding fault signal when said difference drops below a pregiven minimum value or when said difference exceeds a pregiven maximum value.

* * * * *